United States Patent
Caldenhoven et al.

(10) Patent No.: US 10,097,495 B2
(45) Date of Patent: Oct. 9, 2018

(54) IP MULTICAST FOR GEOMESSAGING

(71) Applicant: VODAFONE HOLDING GMBH, Düsseldorf (DE)

(72) Inventors: Jürgen Caldenhoven, Düsseldorf (DE); Ing. Yang Lu, Düsseldorf (DE); Thomas Lang, München (DE)

(73) Assignee: Vodafone Holding GmbH (DE)

( * ) Notice: Subject to any disclaimer, the term of this patent is extended or adjusted under 35 U.S.C. 154(b) by 0 days.

(21) Appl. No.: 15/331,302

(22) Filed: Oct. 21, 2016

(65) Prior Publication Data
US 2017/0118156 A1   Apr. 27, 2017

(30) Foreign Application Priority Data

Oct. 23, 2015   (EP) ................................ 15191317

(51) Int. Cl.
| | |
|---|---|
| H04W 24/00 | (2009.01) |
| H04L 12/58 | (2006.01) |
| H04W 4/02 | (2018.01) |
| H04W 48/08 | (2009.01) |
| H04W 4/12 | (2009.01) |
| H04W 4/029 | (2018.01) |

(52) U.S. Cl.
CPC ............ *H04L 51/20* (2013.01); *H04W 4/028* (2013.01); *H04W 4/029* (2018.02); *H04W 4/12* (2013.01); *H04W 48/08* (2013.01)

(58) Field of Classification Search
CPC ....... H04W 4/028; H04W 4/12; H04W 48/00; H04L 51/20
USPC ...................................................... 455/456.3
See application file for complete search history.

(56) References Cited

U.S. PATENT DOCUMENTS

| | | | |
|---|---|---|---|
| 8,768,603 B2 * | 7/2014 | Foti | G08G 1/096775 701/117 |
| 2007/0263571 A1 * | 11/2007 | Hermann | H04L 12/18 370/338 |
| 2012/0023178 A1 * | 1/2012 | Drevon | H04L 12/1895 709/206 |

FOREIGN PATENT DOCUMENTS

WO   WO 2014/010102 A *  1/2014  ............. H04W 4/06

OTHER PUBLICATIONS

RFC-2009, GPS-Based Addressing and Routing, Imielinski et al. Nov. 1996.*

(Continued)

*Primary Examiner* — William Nealon
(74) *Attorney, Agent, or Firm* — Tarolli, Sundheim, Covell & Tummino LLP (57) ABSTRACT

The invention describes a methods of enabling and performing location-based services especially geomessaging. The invention describes in detail a flexible combination of multicast Internet protocol addresses and area codes in order to generate geomessaging Internet protocol addresses. The geomessaging Internet protocol address enables to receive by means of a mobile communication device (300) according to the invention geomessages and to submit the geomessages by means of the geomessaging network entity (400) according to the invention. No signaling between the mobile communication device (300) and the network or any service provider within the network is necessary to specify the current location of the mobile communication device. Furthermore, there is no need for a geomessaging message provider to know which mobile communication device is currently located within a specific first area.

12 Claims, 8 Drawing Sheets

(56) References Cited

OTHER PUBLICATIONS

RFC-2009, GPS-Based Addressing and Routing, Imielinski et al. Nov. 1996 (sent last office action).*

* cited by examiner

IP MULTICAST FOR GEOMESSAGING

RELATED APPLICATIONS

The present invention is claiming priority from DE 15191317.5, filed 23 Oct. 2015, the entirety of which is incorporated herein by reference.

FIELD OF THE INVENTION

The invention relates to methods of enabling and performing location-based services especially for geomessaging. The invention further relates to a mobile communication device and a geomessaging network entity enabling the method of performing location-based services. The invention further relates to a geomessaging system. The invention finally relates to corresponding computer program products.

BACKGROUND OF THE INVENTION

U.S. Pat. No. 8,768,603 B2 discloses a mobile terminal and an intelligent transportation system (ITS) application client associated with a vehicle. The mobile terminal establishes a first communication link between the mobile terminal and the ITS application client. The mobile terminal also establishes a second communication link, via an infrastructure-based wireless communication network, between the mobile terminal and an ITS application server. Having established these links, the mobile terminal relays one or more event notification messages between the ITS application client and the ITS application server via the first and second links. These one or more messages each indicate the occurrence of an event pertinent to travel conditions. The disclosed method and system thus use a special signaling protocol to send a geolocation of the mobile terminal towards the server.

SUMMARY OF THE INVENTION

It is an object of the present invention to provide an improved method of providing location-based services.

According to a first aspect a method of performing a location-based service by means of a mobile communication device is provided. The method comprises the steps of:

determining a first area by means of the mobile communication device;

assigning by means of the mobile communication device a first area code to at least a first part of the first area for identifying the first part of the first area;

generating a first geomessaging Internet protocol address by integrating by means of the mobile communication device at least a first part of the first area code in a first multicast Internet protocol address;

identifying by means of the mobile communication device at least one first communication item by means of the first geomessaging Internet protocol address;

receiving the first communication item by means of the mobile communication device.

Each method of determining the first area may be used. Examples may be determination of GPS coordinates. Alternatively or in addition, cell identification or tracking area identification information provided by means of the network may be used to determine the first area. A context between the current location and a future location may be alternatively or in addition be used to determine the first area, wherein the future location may be taken as first area.

The first area and the corresponding first area code may depend on the location-based service. This means that the first area code used to generate the first geomessaging Internet protocol address may depend on the service. An additional code may be added, for example, to the cell identification in order to identify the respective location-based service. The multicast Internet protocol address may in this case be used for two, three, four or more different location-based services by using specific and at least partly different first area codes for each location-based service for the same region or location or overlapping regions or locations. Alternatively or in addition, the multicast Internet protocol address may be specific for the respective location-based service. It may even be possible to limit the use of certain multicast Internet protocol addresses to defined regions or locations which can be divided into sub-regions or sub-locations.

The mobile communication device may comprise a list stored in a mobile memory device of the mobile communication device. The list may comprise a relation between the respective location-based service, a location where the mobile communication device actually is or will be in the near future and the first area code. The first area code may be based on data which may be used to indicate a position of the mobile communication device. Such data may be, for example, GPS coordinates or part of GPS coordinates, one or more cell identification and tracking area identification, the name of a WLAN hotspot or the like. Generally, the first area code or the part of the first area code (may be the whole first area code) which is integrated in the multicast Internet protocol address may comprise any code which can be used to identify an area, region or location.

The flexible combination of multicast Internet protocol addresses and first area code or codes which is used to build the geomessaging Internet protocol addresses enables location-based services for big areas or small locations. No signaling between the mobile communication device and the network or any service provider within the network is necessary to specify the current location of the mobile communication device. Furthermore, there is no need for a geomessaging message provider to know which mobile communication device is currently located within a specific first area. The geomessage related to a location-based service can be distributed by means of the geomessaging Internet protocol address. The first communication item may comprise any information which may be relevant for a specific position within a location-based service.

The method may comprise the steps of:

determining the first area by receiving at least one cell identification via a base station of a mobile communication system;

generating the first area code based on the at least one cell identification.

The cell identification (cell ID or global cell ID) of a mobile communication network or a part thereof may in this case be integrated in the multicast Internet protocol address in order to generate the geomessaging Internet protocol address. The mobile communication network may comprise the GSM, UMTS, LTE network or the like. This would be a simple approach in order to generate geomessaging Internet protocol addresses. The mobile communication device receives the cell ID from a base station of the mobile communication network and integrates the cell ID in a multicast Internet protocol address which is reserved for a specific location-based service. This enables a mobile communication device to receive information which may be relevant for the first area which is covered by the base station by means of the location-based service which uses the geomessaging Internet protocol address comprising the cell ID to distribute information relevant for the respective region or location (first area). The region or location for which the information may be relevant may be identical with the area covered by the base station, may overlap with the area covered by the base station or there may be a contextual relation between the area covered by the base station and the region or location.

The method may comprise the steps of:

determining the first area by receiving at least one first GPS coordinate;

generating the first area code based on the at least one first GPS coordinate.

The first area code may comprise the first GPS coordinate. Alternatively, the first GPS coordinate may be used to determine a reference code for identifying a region which comprises the first GPS coordinate. The reference code may, for example, be a reference GPS coordinate which is used to identify the region (first area). A country or town may be covered by means of a number of reference codes. A geomessaging Internet protocol address built by means of GPS coordinates may be used in the same way as the geomessaging Internet protocol address built by means of a cell ID.

The method may alternatively or in addition comprise the steps of:

determining a first movement profile of the mobile communication device;

determining the first area based on the first movement profile of the mobile communication device, wherein the first area is related to a potential future position of the mobile communication device.

The first movement profile may be determined based on GPS data received by means of the mobile communication device. Alternatively or in addition, cell change data and the like may be used in order to determine the movement profile of the mobile communication device. Furthermore, data which may be provided by means of active applications as, for example, navigation applications may be used. GPS data or cell change data may, for example, be compared with navigation data, wherein the navigation data indicates that the user of the mobile communication device travels by car. The mobile communication device may determine by means of this information the actual route of the car and, for example, average velocity. The mobile communication device may further determine by means of this information first areas along the route which may be relevant during travelling. Such first areas may, for example, comprise sections of the route which may probably be reached within a defined time period. The mobile communication device may in this case generate one or more geomessaging Internet protocol addresses covering the sections in order to receive traffic information which may be relevant for these sections. The geomessaging Internet protocol addresses may, for example, comprise in this case specific first area codes or part of the first area codes which can be used to identify a specific motorway or section of the motorway.

According to a further aspect of the invention a mobile communication device is provided. The mobile communication device comprises a mobile radio module, a mobile location determination module, a mobile processing device and a mobile memory device. The mobile location determination module is adapted to determine a first area. The mobile communication device is adapted to assign a first area code to the first area for identifying at least a part of the first area. The mobile processing device is adapted to readout a first multicast Internet protocol address from the mobile memory device. The mobile processing device is further adapted to generate a first geomessaging Internet protocol address by integrating at least a first part of the first area code in the first multicast Internet protocol address, wherein the mobile communication device is adapted to identify at least one first communication item by means of the first geomessaging Internet protocol address. The mobile communication device is adapted to receive the first communication item via the mobile radio module.

The location determination module may be a separate device comprised by the mobile communication device. The location determination module may alternatively be a software module. The location determination module may, for example, comprise a GPS receiver. The location determination module may alternatively or in addition be adapted to read out a cell ID provided by means of a base station of a mobile communication network.

The mobile communication device may, for example assign the first area code to the first area by means of the location determination module or by means of the mobile processing device in combination with the mobile memory device.

The first multicast Internet protocol address may be permanently stored in the mobile memory device, for example, after joining a corresponding service of geomessaging message provider. The mobile communication device or to be more explicit the mobile processing device which may be any kind of processor or microprocessor which is available within a mobile communication device may be used to read out this first multicast Internet protocol address and update the geomessaging Internet protocol address by means of up-to-date location information.

It may be beneficial in an alternative approach to receive the first multicast Internet protocol address prior to generation of the geomessaging Internet protocol address. The mobile communication device may, for example, receive the first multicast Internet protocol address related to a specific service in predetermined intervals. Alternatively or in addition, it may be possible that the mobile communication device requests updated information about a first multicast Internet protocol address which is related to a specific location-based service. Such a request may be triggered by a predetermined time period or a predetermined event (e.g. switching on mobile communication device). The first multicast Internet protocol address received by means of the mobile radio module of the mobile communication device is saved within the mobile memory device of the mobile communication device. The mobile memory device may comprise one or more memory chips, memory cards or other memory modules which can be coupled with the mobile communication device.\

According to a further aspect a first computer program product is provided. The first computer program product comprises code means which can be saved on at least one mobile memory device of the mobile communication device described above. The code means is arranged such that the method described above can be executed by means of the mobile processing device of the mobile communication device.

The first computer program product may, for example, comprise an application (App) which indicates by means of a user interface of the mobile communication device available location-based services. The application enables the user of the mobile communication device to activate a location-based service. Geomessaging Internet protocol addresses related to the specific location-based service or services are generated after activation by means of the application. The activation of the location-based service or services may thus trigger download of multicast Internet protocol addresses which are assigned to the respective services. Geomessaging Internet protocol addresses related to a specific service may only be generated if the mobile communication device is located within a specific region. The latter avoids generation of geomessaging Internet protocol addresses in case of location-based services which are restricted to such specific regions.

According to a further aspect a method of performing a location-based service by means of a geomessaging network entity is provided. The method comprises the steps of:

receiving by means of a geomessaging network entity at least one second communication item, wherein the second communication item is related to a second area;

identifying the second area by means of the geomessaging network entity;

assigning by means of the geomessaging network entity a first area code related to at least a first part of the second area for identifying at least a first part of a first area, wherein the first area is related to at least a first part of the second area;

generating a first geomessaging Internet protocol address by integrating by means of the geomessaging network entity at least a first part of the first area code in a first multicast Internet protocol address, wherein the first geomessaging Internet protocol address is arranged to be received by means of a mobile communication device preferably located within the first area;

transmitting a first communication item by means of the first geomessaging Internet protocol address.

The first communication item may preferably comprise at least a part of the second communication item. Alternatively it may be possible that the second communication item triggers generation of the first communication item.

The geomessaging network entity may be any server or logical node within a communication network or mobile communication network. The second communication item may be received from a geomessaging message provider by means of a wired or wireless communication interface. The second communication item may be the same as the first communication item or the first communication item may comprise the second communication item or at least a part of the second communication item. The second communication item may, for example, comprise header information for identifying the geomessaging network entity and information which is relevant for a certain region or location. The geomessaging network entity may remove the header information and add new header information which may comprise the geomessaging Internet protocol address and optionally further system information.

The geomessaging network entity identifies, for example, by means of the header information the region or location (second area) for which the second communication item or at least a part thereof may be relevant. The second area may comprise a number of sub areas (parts of the first area and other parts of other areas). The geomessaging network entity assigns the first area code to the first area or the part of the first area such that the first area or the part of the first area can be identified by means of the first area code as described above with respect to the method of performing the location-based service by means of the mobile communication device. The first area or part of the first area is related to the second area. Related does not necessary mean that the first area comprises a common area with the second area. An example may be traffic information wherein a traffic jam happens at a defined location of a motorway (second area) and the first area may even be a part of the motorway hundred kilometers away.

First area code within the geomessaging Internet protocol address may be used to more efficiently distribute the first communication item to certain regions of a mobile communication network. Entities of the mobile communication network especially the core network may be able to determine the relevant area by means of the geomessaging Internet protocol address and transfer the first communication item only to this area.

The flexible combination of multicast Internet protocol addresses and first area code or codes avoids signaling between the mobile communication device and the geomessaging network entity which is needed in the prior art approach to specify the current location of the mobile communication device. Furthermore, there is no need for a geomessaging message provider to know which mobile communication device is currently located within a specific first area. The geomessage related to a location-based service can be distributed by means of the geomessaging network entity by using the respective geomessaging Internet protocol address and especially the rule which has to be applied in order to generate geomessaging Internet protocol address.

The step of identifying the second area may comprise the step of:

determining the second area by means of location information comprised in the second communication item.

The geomessaging message provider may identify the second area by means of information comprised in the second communication item. This enables a flexible specification of a second area which may be of interest for the geomessaging message or service provider.

The step of identifying the second area may comprise the step of:

determining the second area by means of an identification of a geomessaging message provider, wherein the geomessaging network entity received the second communication item from the geomessaging message provider.

Alternatively or in addition to the approach of providing information with respect to the second area by means of the second communication item it may be possible that the geomessaging network entity is adapted to determine the second area based on the geomessaging message provider submitting the second communication item. Certain information provided by defined geomessaging message providers may only be interesting for defined regions which essentially do not change in time. An identifier related to the geomessaging message provider may thus be sufficient in order to determine the respective second area.

The method may comprise the further step of:

generating the first area code by integrating at least at least a part of at least one cell identification of a first communication cell of a mobile communication system, wherein the first indications cell is located within the first area.

The cell ID of a mobile communication network or a part thereof may in this case be integrated in the multicast Internet protocol address in order to generate the geomessaging Internet protocol address in the same way as described above with respect mobile communication device. The geomessaging network entity determines one or more cell IDs or groups of cell IDs which are related to the second area. The cell ID or group of cell IDs is integrated in a multicast Internet protocol address which is reserved for a specific location-based service according to the same rule as described above with respect to the mobile communication device. This enables the geomessaging network entity to submit information which may be relevant for the first area which is covered by the base station to distribute information relevant for the respective region or location (first area or part thereof). The region or location for which the information may be relevant may be identical with the area covered by the base station, may overlap with the area covered by the base station or there may be a contextual relation between the area covered by the base station and the region or location.

The method may alternatively comprise the further step of:

generating the first area code by integrating at least a part of at least one first GPS coordinate, wherein the first GPS coordinate is located within the first area.

The first area code may comprise the first GPS coordinate. Alternatively, the first GPS coordinate may be used to determine a reference code for identifying a region which comprises the first GPS coordinate. The reference code may, for example, be a reference GPS coordinate which is used to identify the region (first area). A country or town may be covered by means of a number of reference codes. A geomessaging Internet protocol address built by means of GPS coordinates may be used in the same way as the geomessaging Internet protocol address built by means of a cell ID.

According to a further aspect a geomessaging network entity is provided. The geomessaging network entity comprises a first entity communication interface, an entity location determination module, an entity processing device, an entity memory device and a second entity communication interface. The first entity communication interface is adapted to receive at least one second communication item related to a second area. The entity location determination module is adapted to identify the second area. The geomessaging network entity is adapted to assign a first area code to at least a first part of a first area. The first area is related to at least a first part of the second area. The entity processing device is adapted to read out a first multicast Internet protocol address from the entity memory device based on the second communication item. The entity processing device is further adapted to generate a first geomessaging Internet protocol address by integrating at least a first part of the first area code in a first multicast Internet protocol address. The geomessaging network entity is further adapted to transmit a first communication item by means of the first geomessaging Internet protocol address. The first communication item may preferably but not necessarily comprise at least a part of the second communication item.

The geomessaging network entity may be a single device like a dedicated server comprising one or more processors or processing devices and corresponding memories or memory devices. The geomessaging network entity may alternatively be a distributed arrangement within the hardware architecture of the data provider comprising two or more processing devices and memory devices. The description provided with respect to the method of performing the location-based service by means of the geomessaging network entity also applies to the geomessaging network entity.

The geomessaging network entity may be adapted to determine the first area based on location information comprised in the second communication item and/or context related information comprised in the second communication item.

The second communication item may, for example, comprise explicit information with respect to a defined motorway intersection. The geomessaging network entity may in this case be adapted to determine which motorways cross at the respective motorway intersection. The motorways which cross at the respective motorway intersection are thus context related information comprised in the second communication item. The context related information may be used to extend geographic scope or coverage of geomessages or more general location-based services.

According to a further aspect a second computer program product is provided. The second computer program product comprises code means which can be saved on at least one entity memory device of the geomessaging network entity as described above. The code means are arranged such that the method described above can be executed by means of an entity processing device of the geomessaging network entity.

According to a further aspect a geomessaging system is provided. The geomessaging system comprises a mobile communication device as described above and a geomessaging network entity as described above.

According to a further aspect a method of enabling a location-based service is provided. The method comprises the steps of:

assigning a first multicast Internet protocol address to a first location-based service;

assigning a rule to the first location-based service, wherein the rule determines integration of at least a first part of a first area code in a first multicast Internet protocol address, wherein the first area code is related to a first part of the first area.

Applying the rule to generate a geomessaging Internet protocol address by means of integration of at least a first part of the first area code in the first multicast Internet protocol address by means of one or more mobile communication devices and a geomessaging network entity enables exchange of information related to the first part of the first area without any specific knowledge about the location of the mobile communication device or mobile communication devices. It is only necessary that the mobile communication devices which want to participate in a location-based service apply the respective rule. The mobile communication devices are enabled to receive information provided by means of a specific geomessaging message or service provider by generating the respective geomessaging Internet protocol address for the respective region, location or area they are located in. The geomessaging network entity on the other side sends the information only based on the geomessaging Internet protocol address generated by means of the same rule as applied by the mobile communication device or mobile communication devices.

The method of enabling a location-based service may comprise the additional step of:

informing a mobile communication device about a first location-based service.

The information may be provided after receiving a corresponding request of the mobile communication device in, for example, the geomessaging network entity. Alternatively or in addition it may be possible that the geomessaging network entity submits the information related to the first location-based service based on knowledge about the presence of a mobile communication device within a defined region. Furthermore, it may be possible that there is a kind of master location-based service which uses a special geomessaging Internet protocol address for providing information with respect to other location-based services. The mobile communication device may listen by means of a corresponding application running on the mobile communication device to this special geomessaging Internet protocol address. The application receives the information and presents available location-based services using geomessaging Internet protocol addresses to the user of the respective mobile communication device. The mobile communication device downloads and stores a multicast Internet protocol address related to the selected location-based service and the corresponding rule to generate geomessaging Internet protocol addresses by means of location information such that the service is available in the mobile communication device.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

DETAILED DESCRIPTION OF EMBODIMENTS

Various embodiments of the invention will now be described by means of the Figures.

Figure 1:
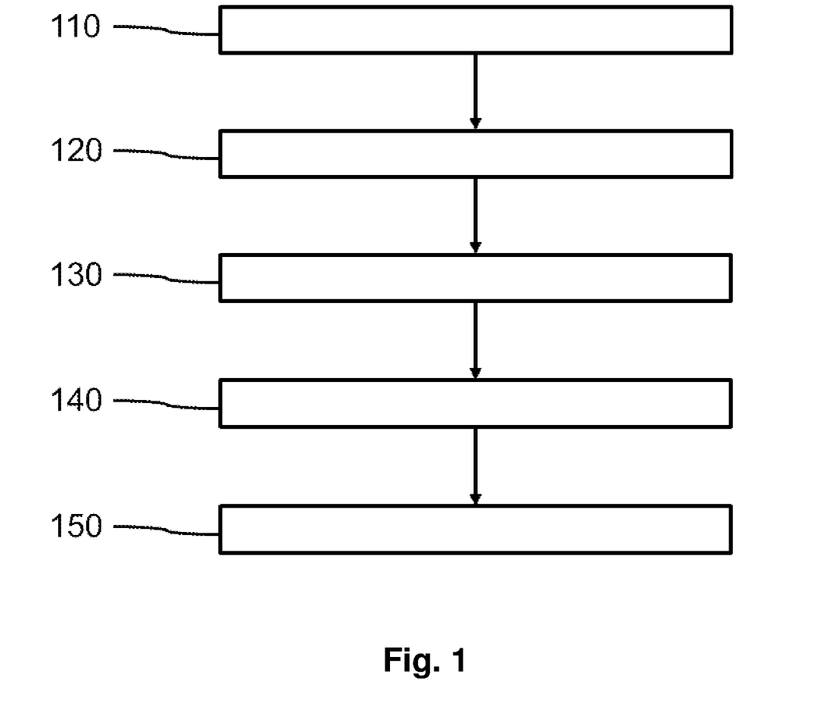
FIG. 1 shows a principal sketch of a method of performing a location-based service by means of a mobile communication device

FIG. 1 shows a principal sketch of a method of performing a location-based service by means of a mobile communication device 300. A first area is determined by means of the mobile communication device 300 in step 110. The mobile communication device 300 assigns in step 120 a first area code to at least a first part of the first area for identifying the first part of the first area. A first geomessaging Internet protocol address is generated in step 130 by integrating by means of the mobile communication device 300 at least a first part of the first area code in a first multicast Internet protocol address. The mobile communication device 300 identifies in step 140 at least one first communication item by means of the first geomessaging Internet protocol address and receives in step 150 the first communication item. The first area code could be a cell ID (Cell Global ID) or a group of cells. The use of Multicast Internet protocol addresses is, for example, described in the Internet Protocol Version 6 (IPv6) Standard.

The geomessaging Internet protocol address may be generated by means of one cell ID cell-1=IP Addr1=FF0A:0:0:0:0:0:1234:1234 or by means of the combination of two, three, four or more cell IDs cell-1+cell-2+ . . . +cell-N=IP Addr2, etc. . . .

The number of cell IDs which may be used to generate the geomessaging Internet protocol address may depend on the location-based service and/or the needs of the user of the mobile communication device 300. The user may, for example, choose a setting which limits the geomessaging Internet protocol address to the cell in which the mobile communication device 300 is present. Alternatively, the user of the mobile communication device 300 may choose the setting such that the user is able to listen to all messages of the specific location-based service by means a geomessaging Internet protocol address or addresses comprising the cell ID and the cell IDs of all cells surrounding the cell in which the mobile communication device is currently present.

Figure 2:
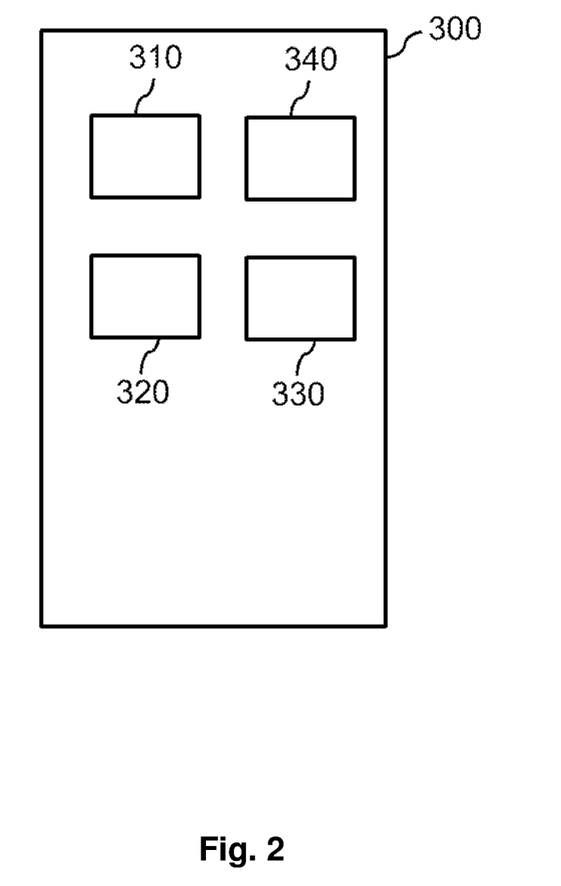
FIG. 2 shows a principal sketch of a mobile communication device

FIG. 2 shows a principal sketch of a mobile communication device 300. The mobile communication device comprises a mobile radio module 310 which is configured to receive and transmit data within the GSM, UMTS, LTE or similar mobile communication networks. The mobile radio module 310 may be further adapted to receive and transmit information in local area networks or by means of similar technology. The mobile communication device 300 further comprises a mobile location determination module 320. The mobile location determination module 320 is in this case a software application stored in a mobile memory device 340 of the mobile communication device 300. The software application is executed by means of a mobile processing device 330 of the mobile communication device 300. The mobile location determination module 320 reads out the cell ID transmitted by means of a base station 460 of the respective mobile communication network. The cell ID comprises information about the area in which the mobile communication device 300 is located in. The cell ID or a code representing the cell ID respectively a number of relevant cell IDs is integrated by means of the mobile processing device 330 in a first multicast Internet protocol address stored in the mobile memory device 340 in order to generate a geomessaging Internet protocol address. The geomessaging Internet protocol address enables a user of the mobile communication device to receive by means of the mobile radio module 310 location-based services and information without providing location information to the mobile communication network. The mobile communication device 300 simply receives all information addressed by means of the geomessaging Internet protocol address.

Figure 3:
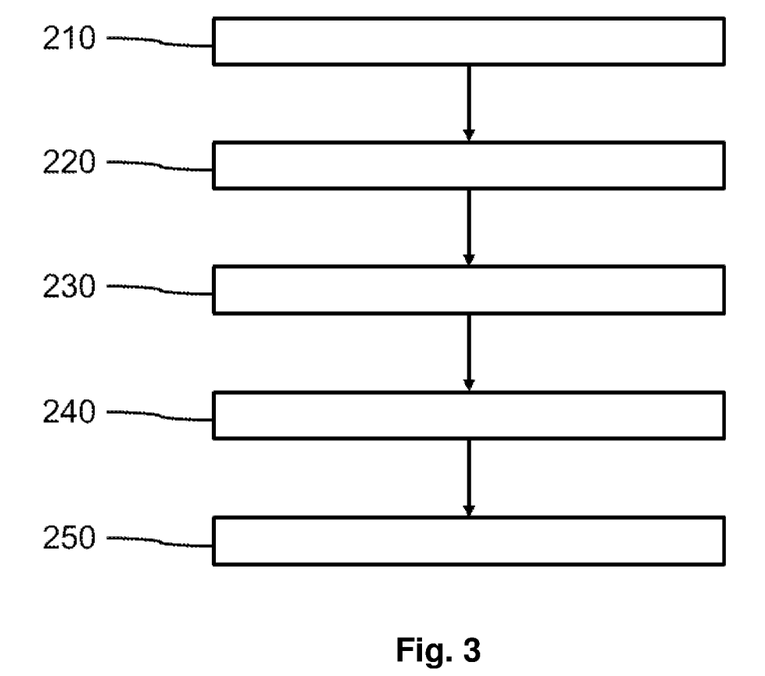
FIG. 3 shows a principal sketch of a method of performing a location-based service by means of a geomessaging network entity

FIG. 3 shows a principal sketch of a method of performing a location-based service by means of a geomessaging network entity 400. The geomessaging network entity receives at least one second communication item in step 310. The second communication item is related to a second area 720. The second area is identified in step 320 by means of the geomessaging network entity 400. The geomessaging network entity 400 assigns in step 330 a first area code related to at least a first part of the second area 720 for identifying at least a first part of a first area 710. The first area 710 is related to at least a first part of the second area 720. A first geomessaging Internet protocol address is generated in step 340 by integrating by means of the geomessaging network entity 400 at least a first part of the first area code in a first multicast Internet protocol address. The first geomessaging Internet protocol address is arranged to be received by means of a mobile communication device 300 located within the first area 710. A first communication item is transmitted in step 350 by means of the first geomessaging Internet protocol address. The first communication item comprises in this embodiment at least a part of the second communication item.

Figure 4:
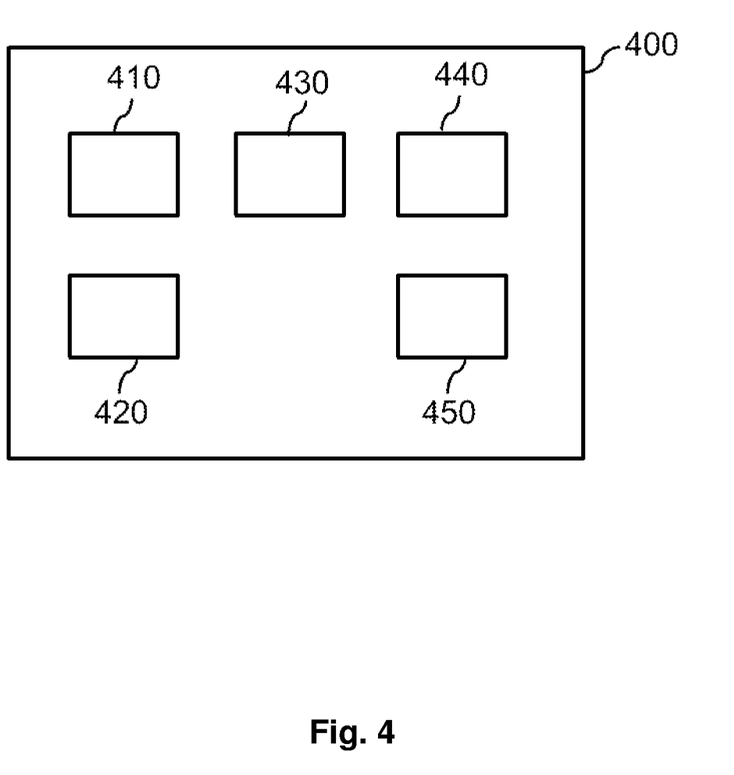
FIG. 4 shows a principal sketch of a geomessaging network entity
Figure 5:
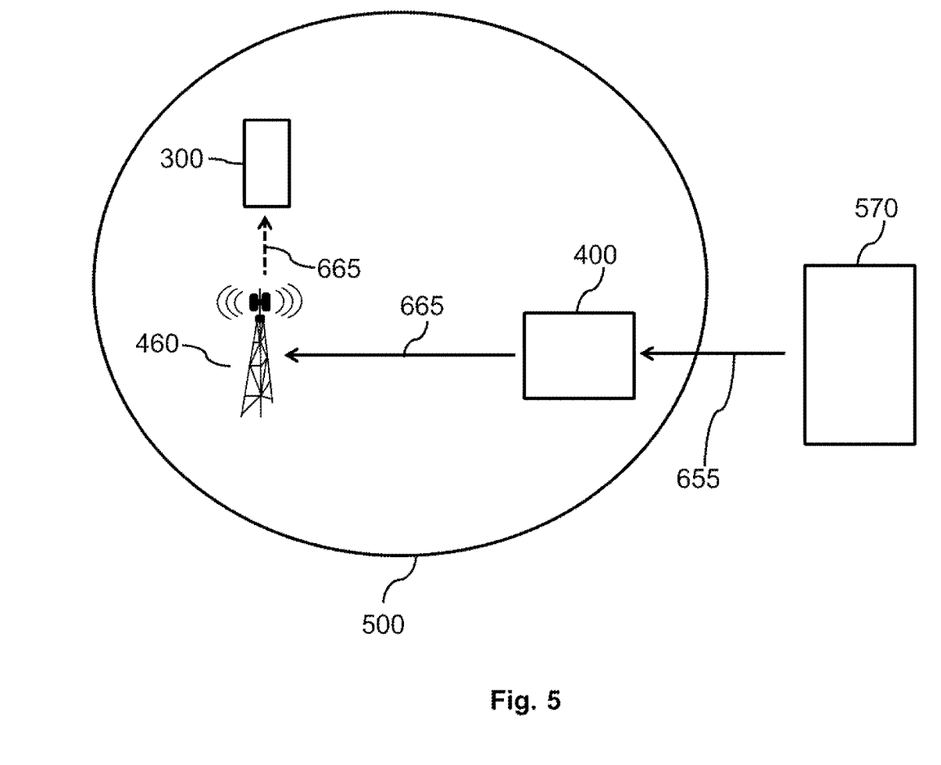
FIG. 5 shows a principal sketch of the geomessaging system

FIG. 4 shows a principal sketch of a geomessaging network entity 400 and FIG. 5 shows a principal sketch of the geomessaging system 500 comprising the geomessaging network entity 440 and the mobile communication device 300. The geomessaging network entity 400 is in this embodiment configured as a server computer which may be controlled by an operator of a mobile communication network. The geomessaging network entity 400 comprises a first entity communication interface 410 which is in this case a wired interface to a geomessaging message provider 570. The geomessaging network entity 400 receives by means of the first entity communication interface 410 geomessages which are relevant for certain regions or areas according to the specifications of the geomessaging message provider 570. The geomessaging network entity 400 determines the region or area which is relevant for the respective geomessage by means of an entity location determination module 420. The determination of the relevant region or area happens in this embodiment by means of header information which is provided together with the geomessage by the geomessaging message provider 570. The header information and the geomessage built a second communication item 655 which is submitted by the geomessaging message provider 570. The header information may, for example, comprise the name of a town or part of a town for which the respective geomessage is designated. The geomessaging network entity 400 determines by means of an entity processing device 430 the cell IDs of the cells of the communication network covering the town or part of the town. The entity processing device 430 further determines the geomessaging message provider 570 which sent the geomessage and reads out the corresponding multicast Internet protocol address from an entity memory device 440 of the geomessaging network entity 400. The geomessaging message provider 570 is identified by means of the header information of the geomessage and/or, for example, the address from which the geomessage has been received by means of the first entity communication interface 410. The entity processing device 430 generates the corresponding geomessaging Internet protocol addresses by integrating the cell IDs of the cells covering the town or part of the town in the multicast Internet protocol address assigned to the geomessaging message provider 570. The geomessage is submitted as a first communication item 665 by means of a wired second entity communication interface 450 to the core network of the mobile communication network using the geomessaging Internet protocol addresses. The core network of the mobile communication network distributes the geomessage by means of base stations 460. Mobile communication devices 300 joining the service of the geomessaging message provider 570 and which are present in the town or part of the town receive the geomessage based on the geomessaging Internet protocol address or addresses generated by the mobile communication devices 300 according to the same rule as applied by the geomessaging network entity 400. The geomessage is in this case related to events happening in the town or part of the town. Mobile communication devices 300 of users joining the service of the geomessaging message provider 570 are informed by means of the geomessage about the events if they are present in the town.

Figure 6:
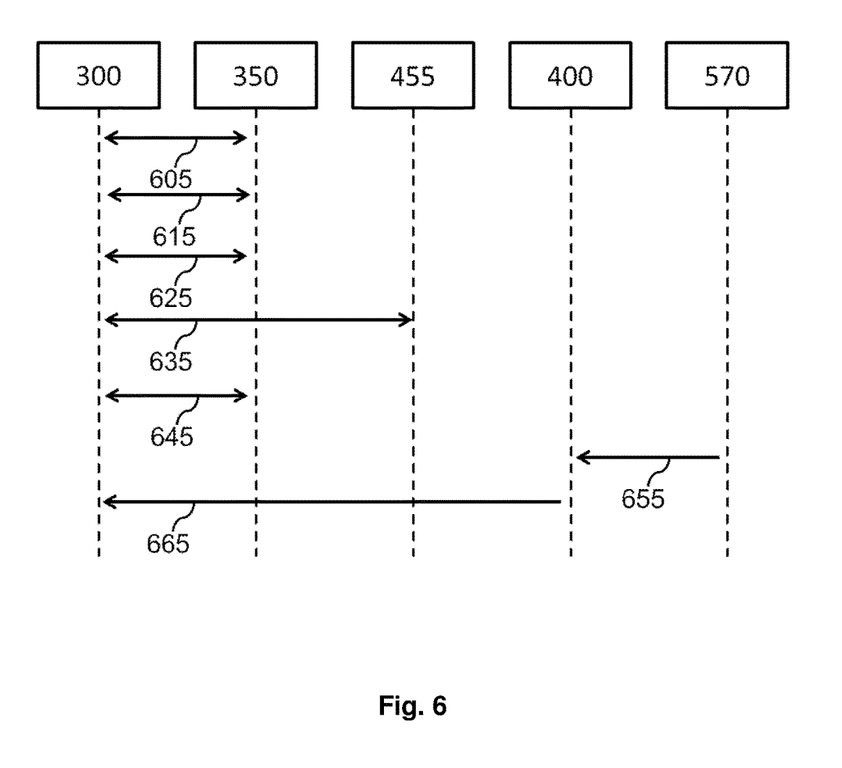
FIG. 6 shows one possible embodiment of enabling geomessaging within a mobile communication network

FIG. 6 shows one possible embodiment of enabling geomessaging within a mobile communication network. The mobile communication device 300 performs in steps 605, 615 and 625 a Radio Resource Control (RRC) connection establishment procedure as defined in 3GPP TS36.331 and the Evolved Packet System (EPS) Attach procedure as defined in 3GPP TS24.301. As a result, the mobile communication device 300 has established a Packet Data Network (PDN) connection towards the Packet Data Network Gateway (PGW) 350 with an IPv6 address assigned by the PGW of the network. The radio link establishment is performed in step 605. The PDN connection is established in step 615 by means of the GPRS Tunnelling Protocol (GTP) between the mobile communication device and the PGW 350. An IPv6 address is assigned in step 625. The IPv6 service is used to tell the mobile communication device 300 that IP Multicast Service is available and that the mobile communication device 300 can join in step 635. This step is performed by exchanging data with a Dynamic Host Configuration Protocol (DHCP) Server 455. The mobile communication device 300 joins the IPv6 multicast group in step 645 via the Multicast Listener Discovery (MLD) protocol. The geomessage is finally distributed by means of the geomessaging network entity 400 which receives the second communication item 655 from the geomessaging message provider 570. The geomessaging network entity 400 distributes the first communication item 665 by means of multicast Internet protocol address assigned to the geomessaging message provider 570 and the first area code integrated in the multicast Internet protocol address in order to build the geomessaging Internet protocol address. The first communication item 665 is distributed by means of the DHCP server 455 and the PGW 350. The mobile communication device 300 receives the geomessage (first communication item) by means of the same geomessaging Internet protocol address generated within the mobile communication device 300.

FIGS. 7-10 show principal sketches of configurations of first areas 710 and second areas 720.

Figure 7:
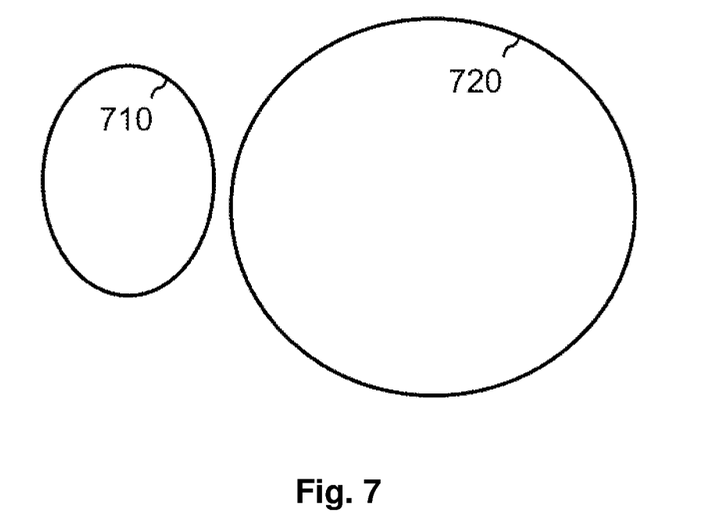
FIGS. 7-10 show principal sketches of configurations of first areas and second areas In the Figures, like numbers refer to like objects throughout. Objects in the Figures are not necessarily drawn to scale.

The first area 710 and the second area 720 may have no overlap according to the embodiment shown in FIG. 7. Such a configuration may, for example, be used for traffic information. The geomessaging message provider 570 may, for example, provide information about an accident in the second area 720. The geomessaging network entity 400 receives the corresponding geomessage with header information (second communication item), determines relevance of the accident for the first area 710 and creates a geomessaging Internet protocol address based on the first area code. A mobile communication device 300 joining the respective geomessaging service being present in the first area 710 receives the geomessage (first communication item) comprising the information about the accident by means of the geomessaging Internet protocol address generated by means of the mobile communication device 300 based on the first area code and the multicast Internet protocol address assigned to the geomessaging message provider 570.

Figure 8:
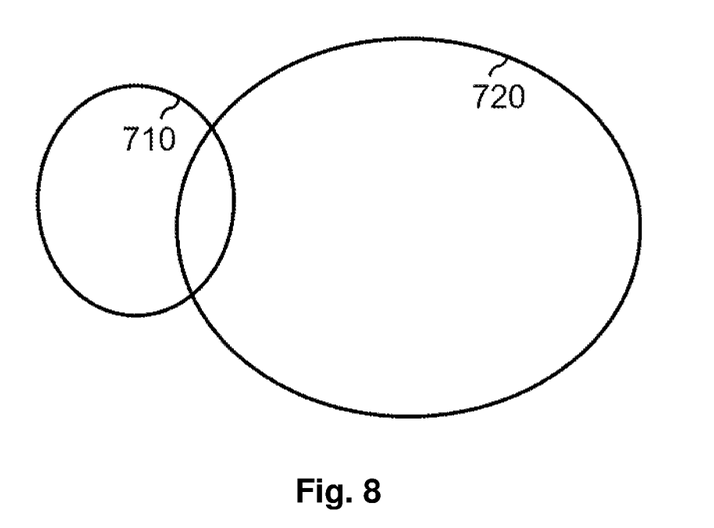

FIG. 8 shows a configuration in which the first area 710 and the second area 720 overlap. The geomessaging network entity 400 may generate in this case a multitude of geomessaging Internet protocol addresses in order to distribute a geomessage relevant for the second area 720. Mobile communication device 300 also generates a multitude of geomessaging Internet protocol addresses in order to cover the first area 710 which comprises location of the mobile communication device 300. At least one of the geomessaging Internet protocol addresses covers the overlap between the first area 710 and the second area 720 such that the mobile communication device 300 can receive the geomessage by means of the corresponding geomessaging Internet protocol address. Similarly, it may be according to the embodiment shown in FIG. 9 that the geomessaging network entity 400 generates a multitude of geomessaging Internet protocol addresses in order to distribute a corresponding geomessage across the second area 720. Mobile communication device 300 is only interested in a part of the second area 720, the first area 710 which is comprised by the second area. The mobile communication device 300 therefore generates only one or more geomessaging Internet protocol addresses in order to receive geomessages within the first area 710. The mobile communication device 300 may receive the geomessage as long as the mobile communication device 300 stays within the second area 720.

Figure 9:
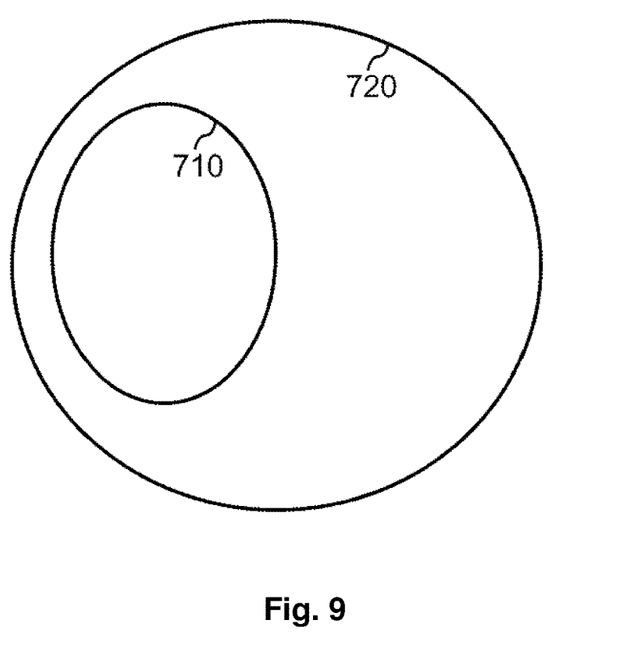
Figure 10:
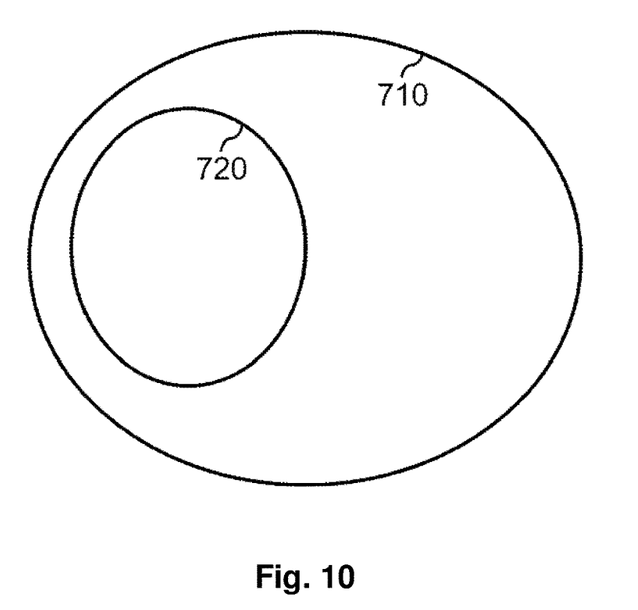

Alternatively, it may be that the geomessaging message provider 570 is only interested to provide the geomessage in a small second area 720 which may, for example, be a town. A user of mobile communication device 300 living outside of the town may be interested in the geomessages of the geomessaging message provider 570. The user may in this case configure the mobile communication device 300 in a way that geomessaging Internet protocol addresses are generated covering the first area 710 which comprises the second area 720 in order to receive corresponding geomessages (e.g. related to event data). The user of the mobile communication device 300 may determine the size of the first area by specifying, for example, a radius around the actual location of the mobile communication device 300. The radius is in this embodiment defined such that the user receives the geomessages for the second area 720 when the user is at home.

It is a basic idea of the present invention to enable location-based services by means of geomessaging Internet protocol addresses based on multicast Internet protocol addresses containing geographical area information. Data can be distributed with geographical relevance to those areas where the information is needed and can be avoided where it is not needed, e.g. traffic jam, other traffic information with geographical relevance. No extra network functionality must be used. Only IPv6 may be used, a simple server functionality for mapping of services to IP addresses for more complex cases. The user of the mobile communication device 300 can join through an app.

The announcement functionality could be implemented using the DHCPv6 procedure during establishment of the PDN connection in an LTE network. DHCPv6 allows to tell the mobile communication device 300 that multicast is available, so the mobile communication device 300 could in turn join the service.

The function to send the messages to mobile communication devices 300 joining the service could be implemented in the PGW 350 or an extra server that also keeps the operator defined geo-areas which may be presented by an Internet protocol multicast address. An additional interface may be used to get knowledge about IP-addresses that joined for authorisation and billing etc. if that functionality is in the PGW 350.

In a straightforward implementation the existing 3GPP procedures may be used to transport the IP packets to mobile communication devices 300 joining a specific multicast group. The PGW 350 may use the existing PDN connection to send the corresponding IP packets.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 110 step of determining first area
120 step of assigning first area code
130 step of generating geomessaging Internet protocol address
140 step of identifying first communication item
150 step of receiving first communication item
210 step of receiving second communication item
220 step of identifying second area
230 step of assigning first area code
240 step of generating geomessaging Internet protocol address
250 step of transmitting first communication item
300 mobile communication device
310 mobile radio module
320 mobile location determination module
330 mobile processing device
340 mobile memory device
350 Packet Data Network Gateway
400 geomessaging network entity
410 first entity communication interface
420 entity location determination module
430 entity processing device
440 entity memory device
450 second entity communication interface
455 Dynamic Host Configuration Protocol Server
460 base station
500 geomessaging system
570 geomessaging message provider
605 radio link establishment
615 link establishment
625 IPv6 address assignment
635 DNS service discovery
645 Establishing IPv6 multicast group
655 second communication item
665 first communication item
710 first area
720 second area

The invention claimed is:
1. A method of performing a location-based service by means of a mobile communication device, the method comprising the steps of:
determining an area by means of the mobile communication device;
assigning by means of the mobile communication device the area code to at least a part of the area for identifying the part of the area;
generating a geomessaging Internet protocol address by integrating by means of the mobile communication device at least a part of the area code in a multicast Internet protocol address;

identifying by means of the mobile communication device at least one communication item by means of the geomessaging Internet protocol address;

receiving the communication item by means of the mobile communication device;

determining a movement profile of the mobile communication device; and determining the area based on the movement profile of the mobile communication device, wherein the area is based on a potential future position of the mobile communication device.

2. The method according to claim 1, wherein the method comprises the steps of:

determining the area by receiving at least one cell identification via a base station of a mobile communication system;

generating the area code based on the at least one cell identification.

3. The method according to claim 1, wherein the method comprises the steps of:

determining the area by receiving at least one GPS coordinate;

generating the area code based on the at least one GPS coordinate.

4. A mobile communication device comprising a mobile radio module, a mobile location determination module, a mobile processing device and a mobile memory device, wherein the mobile location determination module is adapted to determine an area, wherein the mobile communication device is adapted to assign an area code to the area for identifying at least a part of the area, wherein the mobile processing device is adapted to readout a multicast Internet protocol address from the mobile memory device, wherein the mobile processing device is further adapted to generate a geomessaging Internet protocol address by integrating at least a part of the area code in the multicast Internet protocol address, wherein the mobile communication device is adapted to identify at least one communication item by means of the geomessaging Internet protocol address, wherein the mobile communication device is adapted to receive the communication item via the mobile radio module, wherein the mobile communication device is adapted to determine a movement profile of the mobile communication device; wherein the mobile communication device is adapted to determine the area based on the movement profile of the mobile communication device, wherein the area is based on a potential future position of the mobile communication device.

5. A computer program product comprising code means which is stored on at least one mobile memory device of the mobile communication device according to claim 4, wherein the code means are arranged such that method can be executed by means of the mobile processing device of the mobile communication device according to claim 4 the method comprising;

determining an area by means of the mobile communication device;

assigning by means of the mobile communication device an area code to at least a part of the area for identifying the part of the area;

generating a geomessaging Internet protocol address by integrating by means of the mobile communication device at least a part of the area code in a multicast Internet protocol address;

identifying by means of the mobile communication device at least one communication item by means of the geomessaging Internet protocol address;

receiving the communication item by means of the mobile communication device;

determining a movement profile of the mobile communication device; and determining the area based on the movement profile of the mobile communication device, wherein the area is based on a potential future position of the mobile communication device.

6. A method of performing a location-based service by means of a geomessaging network entity, the method comprising the steps of:

receiving by means of a geomessaging network entity at least one communication item, wherein the communication item is based on an area;

determining the area by means of an identification of a geomessaging message provider, wherein the geomessaging network entity received the communication item from the geomessaging message provider;

identifying the area by means of the geomessaging network entity;

assigning by means of the geomessaging network entity an area code based on at least a part of the area for identifying at least a part of a first area, wherein the first area is based on at least the part of the area;

generating a geomessaging Internet protocol address by integrating by means of the geomessaging network entity at least a part of the area code in a multicast Internet protocol address, wherein the geomessaging Internet protocol address is arranged to be received by means of a mobile communication device;

transmitting a communication item by means of the geomessaging Internet protocol address.

7. The method according to claim 6, wherein the step of identifying the area comprises the step of:

determining the area by means of location information comprised in the communication item.

8. The method according to claim 6, the method comprising the further step of:

generating the area code by integrating at least a part of at least one cell identification of a communication cell of a mobile communication system, wherein the cell identification is located within the area.

9. The method according to claim 6, the method comprising the further step of:

generating the area code by integrating at least a part of at least one GPS coordinate, wherein the GPS coordinate is located within the area.

10. A geomessaging network entity comprising a communication interface, a location determination module, a processing device, a memory device and a communication interface, wherein the communication interface is adapted to receive at least one communication item based on an area, wherein the location determination module is adapted to determine the area by means of an identification of a geomessaging message provider, wherein the geomessaging network entity received the communication item from the geomessaging message provider, wherein the geomessaging network entity is adapted to assign an area code to at least a part of an area, wherein the area is based on at least a part of the area, wherein the processing device is adapted to read out a multicast Internet protocol address from the memory device based on the communication item, wherein the processing device is further adapted to generate a geomessaging Internet protocol address by integrating at least a part of the area code in a multicast Internet protocol address, wherein the communication interface of the geomessaging network entity is adapted to transmit a communication item by means of the geomessaging Internet protocol address.

11. The geomessaging network entity according to claim 10, wherein the geomessaging network entity is adapted to determine the area based on location information comprised in the communication item and/or context related information comprised in the communication item.

12. A computer program product comprising code means which is stored on at least one entity memory device of the geomessaging network entity according to claim 10, wherein the code means are arranged such that a method can be executed by means of the entity processing device of the geomessaging network entity according to claim 10, the method comprising;
- receiving by means of a geomessaging network entity at least one communication item, wherein the communication item is based on an area;
- determining the area by means of an identification of a geomessaging message provider, wherein the geomessaging network entity received the communication item from the geomessaging message provider;
- assigning by means of the geomessaging network entity an area code based on at least a part of the area for identifying at least a part of an area, wherein the area is based on at least a part of the area;
- generating a geomessaging Internet protocol address by integrating by means of the geomessaging network entity at least a part of the area code in a multicast Internet protocol address, wherein the geomessaging Internet protocol address is arranged to be received by means of a mobile communication device; and
- transmitting a communication item by means of the geomessaging Internet protocol address.

* * * * *